Jan. 19, 1954
G. H. EASH
2,666,358
COMBINED SOUND REPRODUCER AND PROJECTOR APPARATUS
Filed July 13, 1950
5 Sheets-Sheet 1
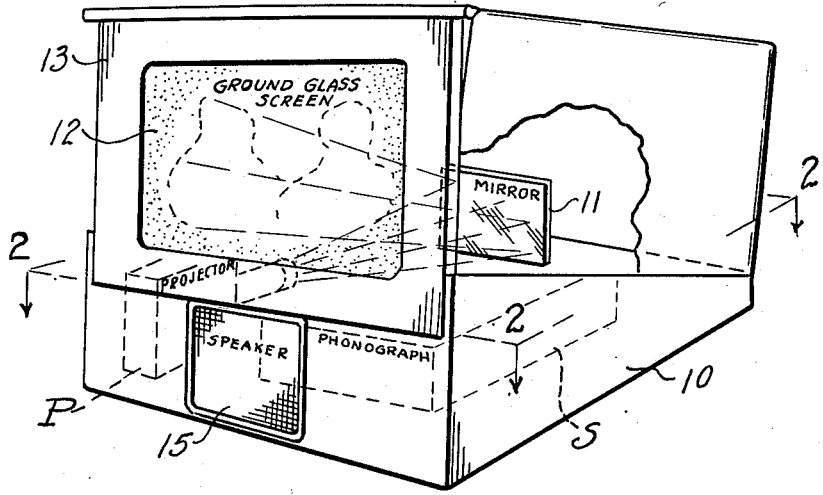
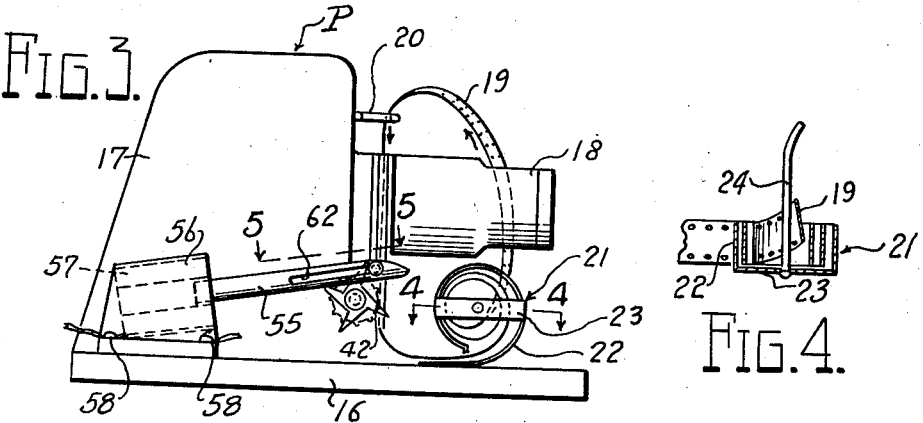
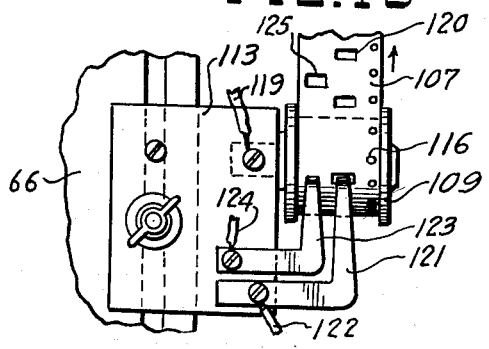
INVENTOR.
George H. Eash
BY
*Nicholas W. Fraser*
ATTORNEY Jan. 19, 1954
G. H. EASH
2,666,358
COMBINED SOUND REPRODUCER AND PROJECTOR APPARATUS
Filed July 13, 1950
5 Sheets-Sheet 2
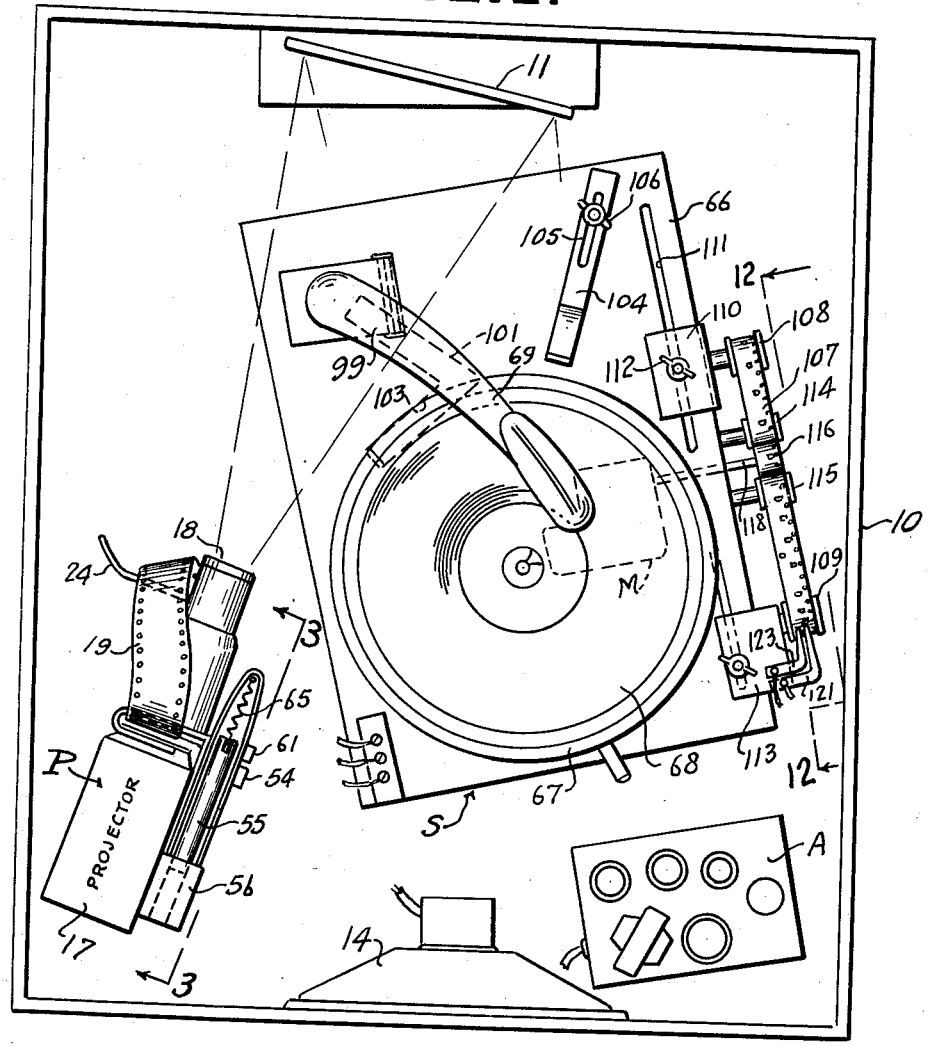
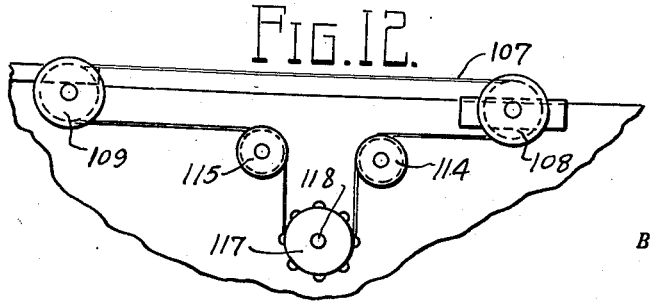
INVENTOR.
George H. Eash
BY
ATTORNEY

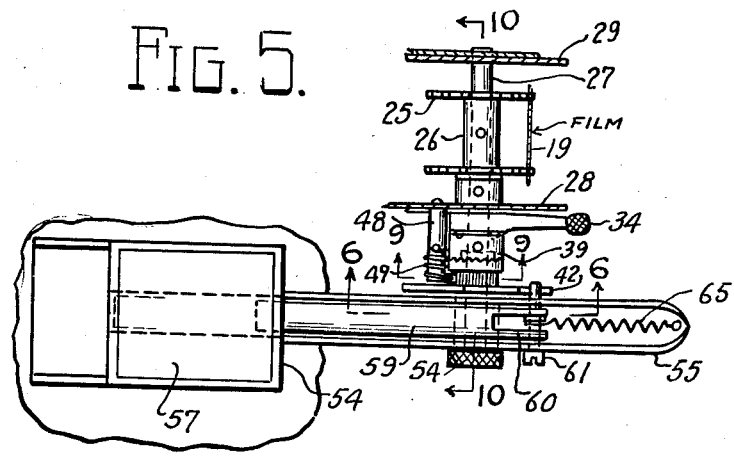
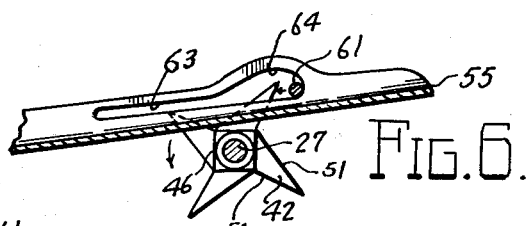
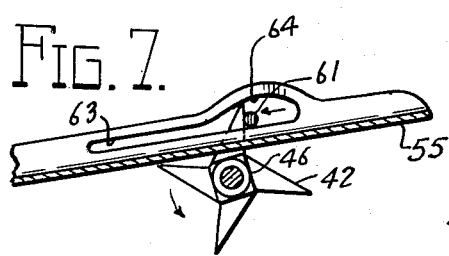
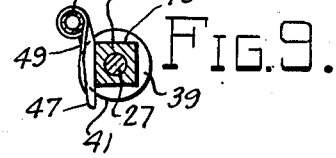
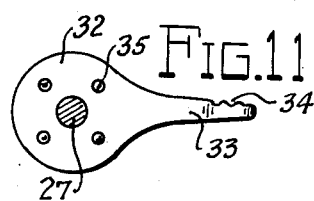
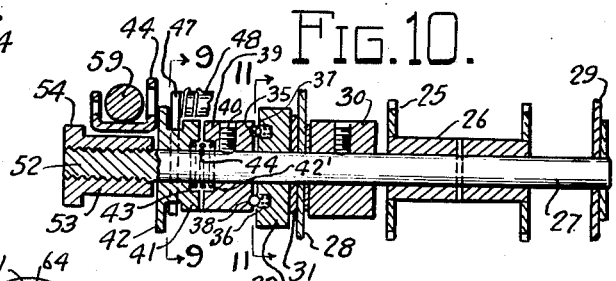
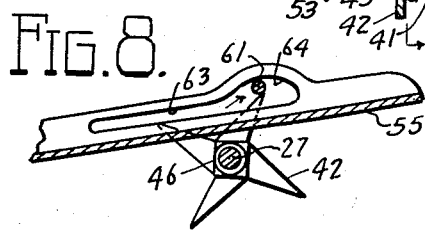

Jan. 19, 1954 G. H. EASH 2,666,358
COMBINED SOUND REPRODUCER AND PROJECTOR APPARATUS
Filed July 13, 1950 5 Sheets-Sheet 4
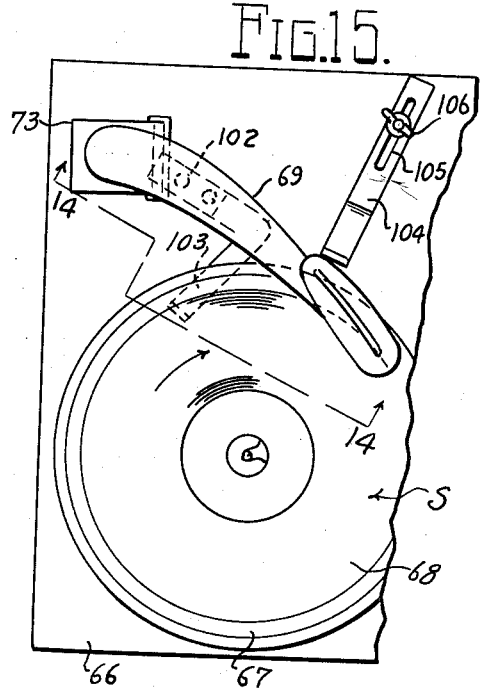
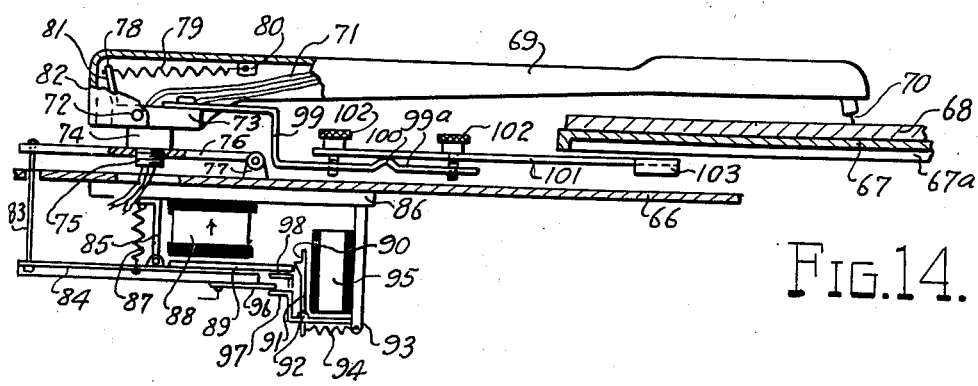
INVENTOR.
George H. Eash
BY
ATTORNEY

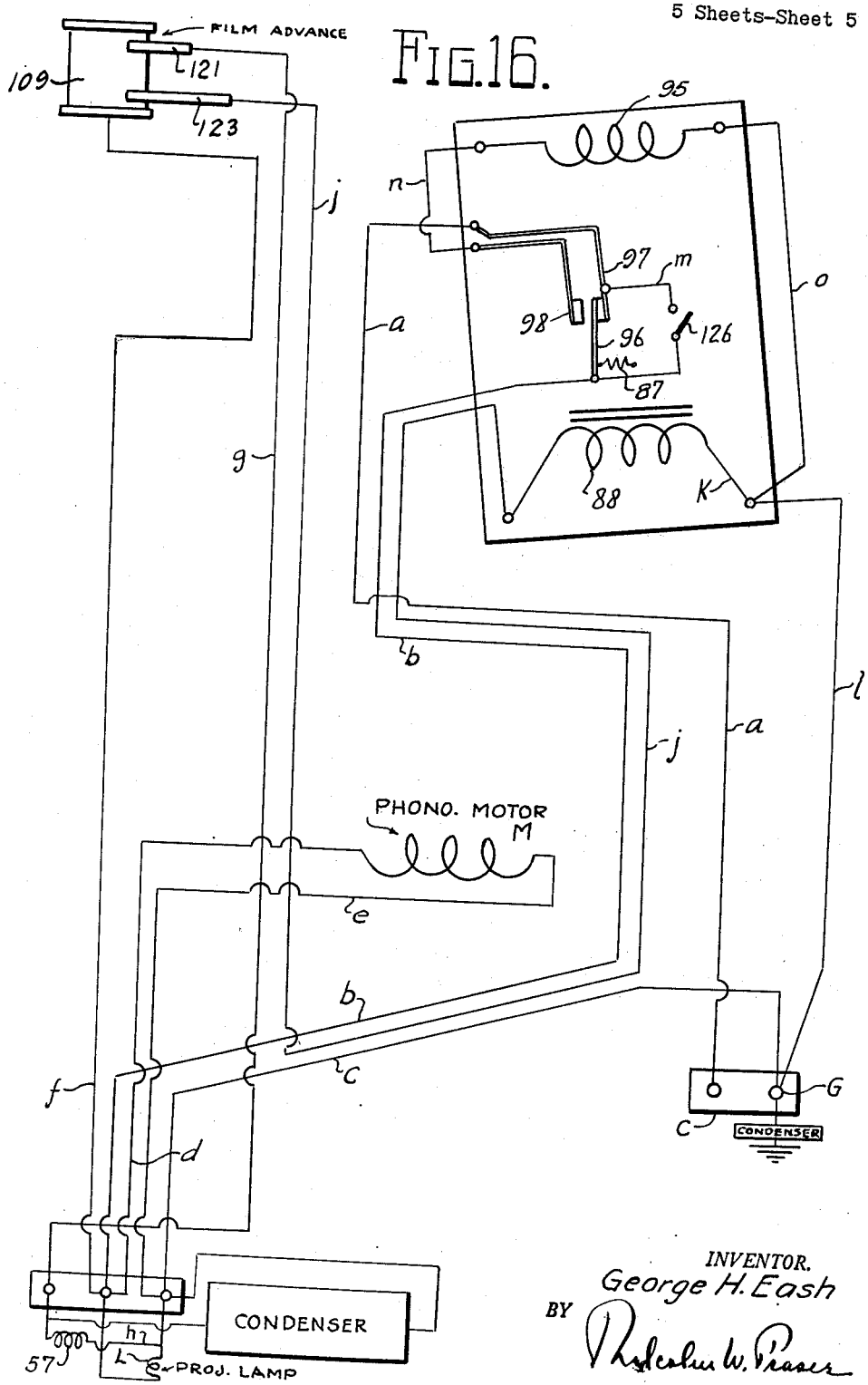

Patented Jan. 19, 1954

2,666,358

UNITED STATES PATENT OFFICE 2,666,358

COMBINED SOUND REPRODUCER AND PROJECTOR APPARATUS

George H. Eash, Toledo, Ohio, assignor to George H. Poulsen, Toledo, Ohio

Application July 13, 1950, Serial No. 173,647

2 Claims. (Cl. 88—28)

This invention relates to a machine or apparatus by which a series of pictures is displayed and, if desired, simultaneously a sound reproducer operates in conjunction therewith.

An object is to produce automatic means for conjointly rendering the picture projector and sound reproducer effective for successively displaying pictures and at the same time causing the sound reproducer to describe the pictures.

Another object is to produce mechanism of the above character which is automatic in its operation and is so constructed and arranged to vary the display interval between pictures so that one picture may be displayed for a shorter or longer period of time than another picture.

A further object is to produce an assembly which can be conveniently housed in a relatively small box containing the sound reproducer and picture display devices, these devices being automatically controlled in such manner that the time interval for the display of individual pictures may be varied as desired and the sound reproducer is coordinated in its operation with respect to the individual pictures or displays.

A still further object is to produce new and improved mechanism for automatically advancing the film strip by electromagnetic means which militates against tearing or damaging the film strip.

A still further object is to improve the mounting of the film strip when an endless strip is employed, enabling the strip to be freely indexed or advanced and automatically to take up the portion of the strip which has been advanced.

A still further object is to produce an endless control tape for the picture feed mechanism and sound reproducer which, in cooperation with other elements, efficiently and automatically controls their operation, the arrangement being such that the period of display of the individual pictures can be predetermined.

A still further object is to mount the pick-up arm for the sound reproducer in a new and improved manner by which it may be lifted from the record, mechanism being associated with such mounting by which the arm is automatically swung to its initial or starting position.

Other objects and advantages of the invention will hereinafter appear, and for purposes of illustration but not of limitation, an embodiment of the invention is shown in the accompanying drawings, in which:

Figure 1 is a front perspective view with some parts broken away to show a box in position of use containing the sound reproducer and film display mechanism contained therein, a portion being broken away for purposes of clarity;

Figure 2 is a horizontal sectional view on an enlarged scale taken on the line 2—2 of Figure 1;

Figure 3 is a side elevation of the projector and taken substantially on the line 3—3 of Figure 2;

Figure 4 is a fragmentary sectional view of the film guide and centering means taken substantially on the line 4—4 o fFigure 3;

Figure 5 is an enlarged sectional view substantially on the line 5—5 of Figure 3, showing the electromagnetic means for indexing or advancing the film strip and the associated mechanism for engaging the film strip and for enabling it to be properly framed;

Figure 6 is an enlarged fragmentary sectional view on the line 6—6 of Figure 5, showing the star wheel and the solenoid operated pin which engages a tooth of the star wheel for effecting the film advance, the parts being shown in starting position;

Figure 7 is a view similar to Figure 6, but showing the solenoid operated pin commencing its advancing movement by which the film strip is advanced one frame;

Figure 8 is a view similar to Figures 6 and 7 but showing the solenoid operated pin in its retracting movement and passing over a tooth of the star wheel;

Figure 9 is a transverse sectional view substantially on the line 9—9 of Figure 10 and showing the actuating sleeve having the flat stop surfaces with which the spring-tensioned arm engages for yieldingly retaining the film feed in a position of advance;

Figure 10 is a longitudinal sectional view on an enlarged scale on the line 10—10 of Figure 5 showing the film feed shaft and associated parts;

Figure 11 is a sectional view on the line 11—11 of Figure 10 showing the framing arm by which the film strip can be manually framed;

Figure 12 is a fragmentary side elevation on the line 12—12 of Figure 2 showing an edge view of the endless control tape and the mounting and drive for same;

Figure 13 is an enlarged fragmentary top plan view of the switch arms, control tape and adjacent roller over which the tape passes and with which the switch arms cooperate;

Figure 14 is an enlarged vertical sectional elevation on the line 14—14 of Figure 15, showing the pick-up arm for the phonograph or sound reproducer and associated mechanism;

Figure 15 is a fragmentary top plan view of the phonograph or sound reproducer showing the turntable pick-up arm and associated parts; and Figure 16 is a wiring diagram for the sound reproducer and projector.

The illustrated embodiment of the invention comprises a housing 10 containing a projector P which projects the image or picture on a mirror 11 which is arranged to reflect it on a suitable screen 12 carried by a frame or panel 13 suitably supported at the front of the box in position to be conveniently viewed. Also within the box 10 is a sound reproducer or phonograph S which has a loud speaker or amplifier 14 provided with a grille 15 arranged at the front of the box as shown in Figure 1.

The projector P is mounted on a base 16 and has a housing 17 in which is disposed the usual electric lamp and reflector (not shown). Extending forwardly from the front end of the housing is the usual lens barrel 18, there being a vertically disposed passage at the inner end portion of the barrel 18 through which the film 19 passes. The film 19 is in the form of an endless strip and may be of the usual 35 mm. motion picture film having spaced rows of perforations which are engaged to advance or index the film in a step by step manner for successively bringing images to the light rays as will be readily understood. The upper end portion of the film 19, after passing over the guide 20 spaced above the barrel 18, passes through the usual film gate. The film then extends downwardly to a holder in which the excess film is coiled. The holder is shown at 21 and has a substantially convolute sheet metal guide 22 which is slightly wider than the width of the film, the lower end being supported by and engaging the base 16. A transverse strap 23 bridges the convolute guide 22 and rigid therewith is a film guide and centering pin 24.

As indicated in Figure 4, the film passing downwardly from the guide 20 may engage the guide pin 24. The film is then loosely coiled within the guide 22 and extends horizontally and upwardly therefrom to the film gate. The loose coil of film contained within the convolute guide or holder 21 enables the use of varying lengths of film since the excess is in the form of a loose coil within the holder 21. As the film is indexed through the film gate, the coiled portion within the holder 21 simultaneously uncoils and coils taking up the excess film and letting out the new film to be passed through the film gate. This exceedingly simple expedient operates efficiently and is desirable and satisfactory not only because of its foolproof simplicity, but also because it eliminates the use of rollers ordinarily employed for receiving the film. The movement of the film over rollers has proved objectionable when recurrently driven, because of the necessary bends in the film which result in cracking the film after a short period of time.

Beneath the lens barrel 18, the endless film strip 19 is engaged by a pair of laterally spaced sprocket wheels 25 on the hub 26, the teeth of the sprocket engaging the holes in the sides of the film strip 19 as will be readily understood. The hub 26 is secured to a shaft 27 for rotation therewith and the shaft 27 has bearing in upright frame parts 28 and 29. Endwise movement of the shaft 27 in one direction is prevented by a collar 30 secured by a set screw to the shaft 27 and arranged on the inner side of the upright 28. On the other side of the upright 28 and spaced therefrom by a washer 31 abutting the upright 28 is the hub 32 of a framing arm 33 which is integral with the hub 32 and has a knurled end portion 34. As will hereinafter appear, the framing arm 33 which projects outwardly a substantial distance from the shaft 27 enables the sprocket wheels 25 to be turned in one direction or the other in order to frame the film properly within the film gate.

On the outer side of the hub of the framing arm 33 are four equi-distantly spaced sockets 35 in which are disposed coil springs 36 which urge balls 37 outwardly into engagement with the recesses 38 in a clutch collar 39. The clutch collar is secured by a set screw 40 to the shaft 27 and has clutch teeth on the outer face to engage and mesh with teeth on a hub 41 of a star wheel 42. The hub 41 is normally free to rotate relative to the shaft 27 but when clutched to the clutch collar 39, rotates with the shaft 27. In the adjacent faces of the clutch collar 39 and the hub 41 are sockets 42' and 43 respectively to receive opposite end portions of a coil spring 44 which surrounds the shaft 27. The hub 41 has a reduced neck 45 which is square in cross section, thereby presenting four flat surfaces 46. An arm 47 is pivoted at one end to a post 48 fixed to the frame member 28. A coil spring 49 has a portion coiled about and anchored to the post 48 and the opposite end bears against the arm 47 to urge it against the reduced neck 45. The star wheel 42 is integral with the outer end of the hub 41 and is formed with four pointed teeth, one side 50 of each tooth being at approximately right angles to the axis of the wheel 42, whereas the opposite side 51 inclines gently in a direction counterclockwise of the wheel, as shown on Figures 6 to 8. The outer end portion 52 of the shaft 27 is screw-threaded to receive a sleeve 53 which is provided with a knurled flanged head 54.

The star wheel 42 is arranged on the inner side of an elongate trough or guide 55 which is open at its top and is fixed at its inner end to a solenoid housing 56. The housing 56 is suitably secured to the base 16 and housing 17 of the projector P. As shown, the trough 55 and housing 56 are upwardly inclined as shown in Figure 3. Within the housing 56 is a solenoid coil 57, the terminals of which are attached to clamping screws 58.

Slidable within the trough 55 is a rod 59, a portion of which at all times is disposed within the solenoid coil 57 so that when the solenoid is energized, the rod or armature 59 is actuated inwardly of the solenoid coil or to the left of Figure 5. The opposite ends of the solenoid housing 56 are open and the solenoid coil 57 is likewise open at its ends so that the rod or armature 59 can pass therethrough. The outer end of the armature rod 59 is bifurcated as indicated at 60 and extending transversely through the bifurcations is a pin 61, the ends of which project beyond opposite sides of the rod 59 and as indicated on Figure 3, the outer side of the trough 55 has a longitudinally elongate slot 62 through which the outer end portion of the pin 61 projects. On the inner side of the trough is an elongate slot 63 which, at its forward end, is enlarged as indicated at 64, at its upper side (Figures 6 to 8). A helical coil spring 65 has one end anchored to the pin 61 between the bifurcations, and the opposite end is anchored to the outer end of the trough 55.

In the operation of the projector P, when the solenoid 57 is energized, the armature rod 59 is attracted to the left of Figure 5, thereby moving the pin 61 into engagement with a side 50 of the adjacent tooth of the star wheel 42. Upon actuated movement of the pin 61, the star wheel 42 is moved in a counterclockwise direction (Figures 6 and 7). The teeth of the star wheel are spaced apart sufficiently so that this movement is sufficient to move the endless film strip 19 one frame when the spring-tensioned arm 47 engages the next succeeding flat surface 46 to retain the sprocket wheels 25 in position for the next succeeding movement. It will be apparent that when the star wheel 42 is rocked in this manner through the clutch teeth, the clutch collar 39 is rotated and since the clutch collar 39 is fixed through the set screw 40 to the shaft 27, the latter turns with it. Since the sprocket wheel assembly is fixed to the shaft, it likewise turns with the shaft 27.

When the solenoid coil 57 is deenergized, then the coil spring 65 returns the pin 61 and the armature rod 59 to its normal or forward position. During the forward movement of the pin 61, it rides over the inclined surface 51 of the adjacent tooth as indicated in Figure 8. The upper enlargement 64 of the elongate slot 63 is sufficient to enable the inner side of the pin 61 to ride over that tooth of the star wheel 42 and pass to the outermost end of the slot 63 to the position shown in Figure 6 where it is ready for the next succeeding advancing movement. During such retracting movement of the pin 61, the outer end portion of the pin 61 rides in the slot 62 which is of substantially uniform width throughout its length. Thus it will be understood that only the inner end portion of the pin 61 rocks upwardly to clear the star wheel 42 during such retracting movement.

It will be understood that maximum power is imparted to the armature rod 59 at the start of its power stroke and this power decreases gradually as the rod moves to the left of Figure 5 so that it gradually slows down at the end of its power movement. This is advantageous since it obviates the liability of tearing out the holes in the film strip 19. Manifestly, the maximum power is necessary to start the movement of the film strip but once the film strip is in motion, less power is required to further advance it. This result is achieved by employing an open ended solenoid coil enabling a portion of the armature rod to pass completely through the coil so that the slowing down of the movement is not abrupt, but a gradual one due to the action of the solenoid coil and the resistance created by the tensioning of the coil spring 65.

To enable the film strip to be manually framed within the film gate, the knurled head 54 of the screw-threaded sleeve 53 is loosened or unscrewed. This enables the coil spring 44 to move the clutch teeth away from each other so that the shaft 27 may be rotated independently of the star wheel 42. This rotation or turning movement of the shaft 27 may be effected by the framing arm 33 which through the spring-tensioned balls 37, has a clutching engagement with the clutch collar 39. Thus by actuating the framing arm 33 in one direction or the other, the sprocket wheels 25 can be turned to advance or retract the film relative to the film gate. When the proper adjustment has been made, then the sleeve 53 is tightened and the parts resume their normal operation. The arrangement is such that during the normal operation of the parts, the framing arm 33 remains stationary but the clutch collar 39 and other parts may turn relatively to the arm 33.

The sound reproducer or phonograph S comprises a platform 66 on which is suitably mounted a turntable 67 to receive a record disc 68. Rotation is imparted to the turntable 67 by an electric motor M within the platform 66 suitably geared to drive the turntable at the proper speed. Mounted on the box at one side of the turntable 67 is a pick-up arm 69 which carries the usual recording engaging needle or stylus 70. Carried by the forward end of the arm is the usual electrical pick-up unit (not shown) from which the wires 71 lead to a suitable amplifier A (Figure 2) suitably connected to the speaker 14. The pick-up arm 69 is channel-shaped and is pivotally connected adjacent its rear end by trunnions 72 to the head 73 of a supporting post 74 which has a reduced screw-threaded extension 75 in threaded engagement with the intermediate end portion of an arm 76 which is pivoted at one end to a bracket 77 on the platform 66, the wires 71 passing through an opening in the head 73 and through the post 74 and extension 75 which are hollow.

Rigid with the block 73 and projecting upwardly and rearwardly therefrom is a plate 78 to which one end of a coil spring 79 is connected. The opposite end of the coil spring 79 is connected to a bracket 80 secured to the inside of the pick-up arm 69. The plate 78 normally is engageable with a stop surface 81 projecting inwardly from the end wall 82 of the pick-up arm.

Secured to the outer end of the arm 76 and extending through an aperture in the platform 66 is a depending rod 83 which is connected at its lower end to an arm 84 which is pivoted centrally to a bracket arm 85 depending from a plate 86 secured to the under side of the platform 66. When the arm 84 is rocked in a counterclockwise direction (Figure 14), pulling downwardly on the arm or link 83, the arm 76 is swung downwardly in a counterclockwise direction and through the engagement of the plate arm 78 and the stop 81, the operating or free end of the pick-up arm 69 is raised away from the record 68. Normally, a coiled spring 87 urges the left-hand end of the arm 84 upwardly toward the platform 66 or to dispose the pick-up arm 69 in record playing position. Actuation of the arm 84 in a counterclockwise direction which lifts the pick-up arm from the record, is effected by a solenoid 88 adjacent the right-hand end portion of the arm 84. On the upper side of this end portion of the arm 84 is a plate extension 89 which is adapted to engage a catch 90 when the solenoid 88 is energized to attract the arm 84 towards it. Thus the catch 90 retains the tone arm or pick-up arm 69 in its elevated or inoperative position. The catch 90 is carried by an arm 91 which is pivoted at 92 to a generally L-shaped bracket arm 93 depending from the mounting plate 86. The lower end portion of the arm 91 is tensioned by a coil spring 94. Carried by the bracket arm 93 is a solenoid 95 which when energized, attracts the arm 91 in order to move the catch 90 away from the extension plate 89. This releases the extension plate 89 and enables the spring 87 to move the arm 84 away from the solenoid 88. As a result, the pick-up or tone arm 69 is rocked into record engaging position.

On the under side of the lever arm 84 is a contact strip 96 which is movable between contact members 97 and 98. The electrical operation will hereinafter be described. When the pick-up arm 69 is lifted to its inoperative position away from the record 68, means is provided for swinging the pick-up arm horizontally so that it is in position to engage the outer edge portion of the record 68 in order to start playing the record from the beginning. For this purpose, a sheet metal bracket arm 99 is suitably fixed to the top of the head 73 and extends for a short distance beneath and parallel to the pick-up arm 69 and then is bent at right angles downwardly and terminates in a horizontal end portion 99a. An upwardly extending nubbin 100 is formed in the end portion 99a and abuts against the under side of a substantially L-shaped retracting arm 101. A pair of screws 102 on opposite sides of the nubbin 100 adjustably connect the retracting arm to the bracket arm portion 99a.

Fitting over the free end portion of the retracting arm 101 is a rubber sleeve 103 which extends beneath the turntable 67 in position to engage the downwardly flanged edge portion 67a of the turntable.

When the pick-up arm 69 is rocked away from the record 68 in response to the action of the solenoid 88 as above described, the tilting movement of the head 73 operates to move the rubber sleeve into engagement with the flange 67a of the turntable. Since the turntable is rotating in a clockwise direction (Figure 15), the frictional engagement between the rubber sleeve 103 and the turntable causes the tone arm or pick-up arm 69 to move abruptly to the right into engagement with an adjustable stop arm 104 which is in such position that the pick-up arm will be stopped in the proper position with respect to the record 68 so that upon resumption of operation, the stylus or needle 70 will engage the record at the beginning. The stop arm 104 has an elongate slot 105 to receive a bolt having a wing nut 106 to enable the adjustment of the stop arm on the platform 66 to the desired position.

Mounted at one side of the platform 66 is a control device by which both the sound reproducer S and the operation of the projector P are controlled. As shown, an endless tape 107 is trained about a pair of laterally spaced flanged rollers 108 and 109. The roller 108 is carried by a bracket 110 which is adjustable along the platform 66 by means of an elongate slot 111 and a bolt having a wing nut 112. Similarly, the roller 109 is carried by a bracket 113 which is similarly mounted for adjustment along the platform 66. Disposed between the rollers 108 and 109 and spaced below them is a pair of laterally spaced guide rolls 114 and 115. Conveniently the tape 107 may be of standard 16 mm. film strip having sprocket holes 116 on one side only. These holes are engaged by teeth of a sprocket wheel 117 which is disposed between and below the guide rolls 114 and 115. The sprocket wheel 117 is secured to a shaft 118 which is suitably connected to be driven by the phonograph motor M, suitable reducing gearing (not shown) being provided so that the sprocket wheel 117 will be driven at a proper predetermined speed which will be determined by the period of display desired for the pictures which, of course, must be coordinated with the sound from the record.

The flange roller 109 is of brass or other electrical conductive material and connected thereto in any suitable manner is a lead 119. Formed in the tape 107 is a series or row of perforations 120 which, as shown, are rectangular in shape. An inverted L-shaped contact arm 121, secured at one end to the plate 113, has its free end in wiping contact with the outer surface of the tape 107. When one of the perforations 120 is encountered, the free end of the contact arm 121 momentarily engages the peripheral surface of the roller 109, thereby transmitting current through the lead 122 to the solenoid 57 of the film feeding device. The perforations 120 are spaced from each other in any desired predetermined manner, depending upon the time interval desired for displaying a particular picture. Thus it is possible to have all of these perforations uniformly spaced so that the frames of the film strip 19 will be successively displayed for the same period of time. On the other hand, if it is desired to have one picture displayed for a longer period of time than another, this can be accomplished by a greater spacing between adjacent perforations 120. Thus whatever operation of the projector is desired, this may be accomplished according to the predetermined arrangement of the perforations 120.

Arranged adjacent the contact arm 121 is a similarly shaped arm 123 to which the phonograph motor M is connected by a lead 124. The free end of the contact arm 123 has wiping engagement with the tape 107 at one side of the arm 121. Formed in the tape 107 in position to be contacted by the free end of the contact arm 123 is a rectangular perforation 125 which is approximately twice the size of the perforations 120. When the contact arm 123 engages the roller 109 through the perforation 125, the electrical connections are such that assuming that the starting switch 126 is open, the phonograph motor M is stopped and thereby the entire apparatus is stopped until a starting switch is again actuated. This will be more apparent from the following description of the wiring diagram.

Figure 16 shows the electrical wiring diagram for the apparatus in which C designates a source of electrical energy which may be the ordinary A. C. house current. The starting switch is designated by the number 126. It must be assumed that initially the tone arm or pickup arm 69 is in its raised or inoperative position and the plate extension 89 is retained in its uppermost position by the catch 90.

Current from the source C passes through a lead a to the arm 97 and then the arm 96, which is in engagement with the arm 97, and thence through a lead b to the projector lamp L which is disposed within the projector P. From the projector lamp L current passes through the lead c back to the ground G. Joining the lead b is a lead d which extends to the windings of the phonograph motor M, the circuit being completed by the lead e which joins the ground lead c. Likewise included within this circuit is a control circuit, the lead f being joined to the lead b and extending to the roller 109. When the contact arm 121 engages the roller 109, current passes from there through the lead g to the film advance solenoid 57, the solenoid being grounded through the lead h which joins to the ground lead c. When the contact arm 123 engages the roller 109, current then passes from the arm through the lead j to the solenoid 88 which upon being energized, causes the arm 96 to be drawn into engagement with the contact arm 98. The solenoid 88 is grounded through the lead k which connects to a common ground lead l.

If the starting switch 126 is closed, then current will pass through the starting switch leads m through the arm 96 to the contact piece 98 through lead n to the solenoid 95 which is grounded through the lead o. By energizing the solenoid 95, the catch arm will be rocked to a position away from the arm 96 so that the operation of the entire mechanism is continuous, the phonograph motor M will continue its operation as will the endless control tape 107. On the other hand, if the starting switch 126 is open, then upon energizing the solenoid 88, the arm 96 will be moved into engagement with the contact 98 and retained in that position by the catch 90 thereby retaining the pickup or tone arm in its inoperative elevated position. Thus when the starting switch 126 is open, no current can pass to the catch controlling solenoid 95.

Numerous changes may be effected without departing from the spirit of the invention especially as defined in the appended claims. For example, the solenoid employed for advancing the film may be energized by means of a high or low frequency note on the phonograph record through means well known in the art. As a further alternate means, a short piece of electrical conductive material may be placed on the edge of the film at a predetermined location which, in passing through suitable contacts, would trip the record repeat mechanism. These expedients would be employed in substitution for the control tape above described. In the event that the high or low frequency note were used on sound tape rather than records, the film advance method would be the same. However, the phonograph repeating mechanism could then be energized by either putting the conductive material on the film or on the sound tape at a suitable point.

What I claim is:

1. In a combined picture projector and sound reproducer control means, a picture projector including an electric lamp and electric circuit therefor, a solenoid frame by frame film advance mechanism and an electrical circuit for said solenoid; an automatic replay phonograph including a rotatable record, an electric motor and circuit therefor for driving said record, and a tone arm; solenoid lift means for raising said tone arm to an inoperative position, a latch for retaining said tone arm in inoperative position, and solenoid release means for releasing said latch so as to lower said tone arm; a combined projector and phonograph control mechanism including a continuous control strip having a row of film advance control elements therealong, and at least one master stop control element thereon in a row adjacent the first mentioned row; a positive strip drive mechanism driven by said phonograph motor and rotating with said record, a film advance sensing element engageable with said film advance control elements and electrically connected with the solenoid film advance mechanism; a master stop sensing element engageable with said master stop control element and electrically connected to said solenoid lift means for said tone arm, and an electrical input circuit leading to said control mechanism and closing through said control elements with said sensing elements from time to time as said strip is driven; automatic switch means including an arm movable between first and second contacts respectively in accordance with the raising and lowering of said tone arm, an electrical connection between said switch arm and the circuit for the electric motor, the projector lamp, and the input circuit for the combined control mechanism; a source of electrical energy; an electrical connection between the first switch contact and the source of energy, an electrical connection between the second switch contact and the solenoid release means for the tone arm retaining latch; and a starting switch connected between said first contact and said switch arm, whereby when starting switch remains closed, the operation of said projector and phonograph is continuous but whereby, when said starting switch is open, said phonograph and projector are de-energized by said automatic switch means upon closing of the input circuit of the combined control mechanism with said master stop sensing element.

2. In a combined picture projector and sound reproducer control means, a picture projector including an electric lamp and electric circuit therefore, a solenoid frame by frame film advance mechanism and an electrical circuit for said solenoid; an automatic replay phonograph including a movable record, an electric motor and circuit therefor for driving said record, and a tone arm; solenoid disabling means for rendering said tone arm inoperative, latch means for retaining said tone arm in inoperative condition, and solenoid release means for releasing said latch means so as to enable said tone arm operative; a combined projector and phonograph control mechanism including a continuous control strip having a row of film advance control elements therealong and at least one master stop control element thereon in a row adjacent the first mentioned row; a positive strip drive mechanism driven by said phonograph motor and rotating with said record, a film advance sensing element engageable with said film advance control elements and electrically connected with the solenoid film advance mechanism; a master stop sensing element engageable with said master stop control element and electrically connected to said solenoid disabling means for said tone arm, and an electrical input circuit leading to said control mechanism and closing through said control elements with said sensing elements from time to time as said strip is driven; automatic switch means including an arm movable between first and second contacts respectively in accordance with the disabling and enabling of said tone arm, an electrical connection between said switch arm and the circuit for the electric motor, the projector lamp, and the input circuit for the combined control mechanism; a source of electrical energy; an electrical connection between the first switch contact and the source of energy, an electrical connection between the second switch contact and the solenoid release means for the tone arm retaining latch; and a starting switch connected between said first contact and said switch arm, whereby when starting switch remains closed, the operation of said projector and phonograph is continuous but whereby, when said starting switch is open, said phonograph and projector are de-energized by said automatic switch means upon closing of the input circuit of the combined control mechanism with said master stop sensing element.

GEORGE H. EASH.

References Cited in the file of this patent

UNITED STATES PATENTS

| Number | Name | Date |
|---|---|---|
| 1,254,272 | Ponon | Jan. 22, 1918 |
| 1,295,653 | Wells | Feb. 25, 1919 |
| 1,315,224 | Hill | Sept. 9, 1919 |
| 1,889,785 | Hoppe | Dec. 6, 1932 |
| 1,998,889 | Wier | Apr. 23, 1935 |
| 2,037,601 | Shirlow | Apr. 14, 1936 |
| 2,088,516 | Grier | July 27, 1937 |
| 2,136,209 | Finch | Nov. 8, 1938 |
| 2,141,037 | Franklin | Dec. 20, 1938 |
| 2,240,321 | Thompson et al. | Apr. 29, 1941 |
| 2,279,119 | Freimann | Apr. 7, 1942 |
| 2,366,858 | Knox et al. | Jan. 9, 1945 |
| 2,371,836 | Masterson | Mar. 20, 1945 |
| 2,475,439 | Waller et al. | July 5, 1949 |
| 2,509,811 | Dale | May 30, 1950 |
| 2,551,350 | Supitilov et al. | May 1, 1951 |